United States Patent
Takeda et al.

(10) Patent No.: US 9,277,075 B2
(45) Date of Patent: Mar. 1, 2016

(54) COLOR ERASING APPARATUS, COLOR ERASING SYSTEM AND COLOR ERASING CONTROL METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Kazuhisa Takeda, Shizuoka-ken (JP); Tsuyoshi Itou, Izunokuni (JP); Masahiro Ikuta, Mishima (JP); Takafumi Hara, Shizuoka-ken (JP); Motonari Udo, Mishima (JP); Takayasu Aoki, Mishima (JP); Yasuhito Noda, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/287,939

(22) Filed: May 27, 2014

(65) Prior Publication Data
US 2015/0350477 A1    Dec. 3, 2015

(51) Int. Cl.
| | |
|---|---|
| *H04N 1/00* | (2006.01) |
| *G06K 15/02* | (2006.01) |
| *H04N 1/23* | (2006.01) |
| *B41J 2/32* | (2006.01) |

(52) U.S. Cl.
CPC .............. *H04N 1/00803* (2013.01); *B41J 2/32* (2013.01); *G06K 15/02* (2013.01); *H04N 1/2323* (2013.01); *H04N 2201/0094* (2013.01)

(58) Field of Classification Search
USPC ........................................... 358/1.13
See application file for complete search history.

(56) References Cited

U.S. PATENT DOCUMENTS

| | | | | |
|---|---|---|---|---|
| 2010/0271410 | A1* | 10/2010 | Kaneko | B41J 29/38 347/6 |
| 2011/0222131 | A1 | 9/2011 | Yahata et al. | |
| 2011/0234721 | A1* | 9/2011 | Endo | G03G 15/6555 347/101 |
| 2014/0213444 | A1* | 7/2014 | Takada | F27B 9/40 503/201 |

* cited by examiner

*Primary Examiner* — Ngon Nguyen
(74) *Attorney, Agent, or Firm* — Amin, Turocy & Watson, LLP

(57) ABSTRACT

In accordance with one embodiment, a color erasing apparatus comprises a conveyance path, a color erasing section and a control section. The conveyance path conveys a sheet. The color erasing section erases the color of an image formed with color erasable recording agent serving as recording agent containing coloring agent the color of which can be erased by heating. The control section carries out a control, in a case where the image formed on the sheet is not an image formed with the color erasable recording agent, so that the sheet is not subjected to a color erasing processing by the color erasing section.

10 Claims, 9 Drawing Sheets

| COLOR OF SHEET | THRESHOLD VALUE | |
|---|---|---|
| WHITE | t1 | 91 |
| BLUE | t2 | 91 |
| GRAY | t3 | 91 |
| ⋮ | ⋮ | |

COLOR ERASING APPARATUS, COLOR ERASING SYSTEM AND COLOR ERASING CONTROL METHOD

FIELD

Embodiments described herein relate generally to a color erasing apparatus, color erasing system and a color erasing control method.

BACKGROUND

In recent years, in an image forming apparatus such as a MFP (Multi Function Peripheral), an image is formed on a sheet-like medium (hereinafter referred to as "sheet") such as paper with recording agent (hereinafter referred to as "color erasable recording agent") containing erasable coloring agent. The color of the color erasable recording agent can be erased when heated to a high temperature.

A heat roller, in which a roll type heat source is arranged, and a press roller are arranged opposite to each other in the color erasing apparatus. The color erasing apparatus heats paper with the heat roller and the press roller to erase the color of the image formed on the paper.

However, if a sheet on which an image is formed with recording agent (for example, normal toner) different from the color erasable recording agent is conveyed to the heat roller (heat source) of the color erasing apparatus, offset may occur on the heat roller.

DETAILED DESCRIPTION

In accordance with one embodiment, a color erasing apparatus comprises a conveyance path, a color erasing section and a control section. The conveyance path conveys a sheet. The color erasing section erases the color of an image formed with color erasable recording agent serving as recording agent containing coloring agent the color of which can be erased by heating. The control section carries out a control, in a case where the image formed on the sheet is not an image formed with the color erasable recording agent, so that the sheet is not subjected to a color erasing processing by the color erasing section.

The color erasing apparatus according to embodiment is described below with reference to the accompanying drawings.

Figure 1:
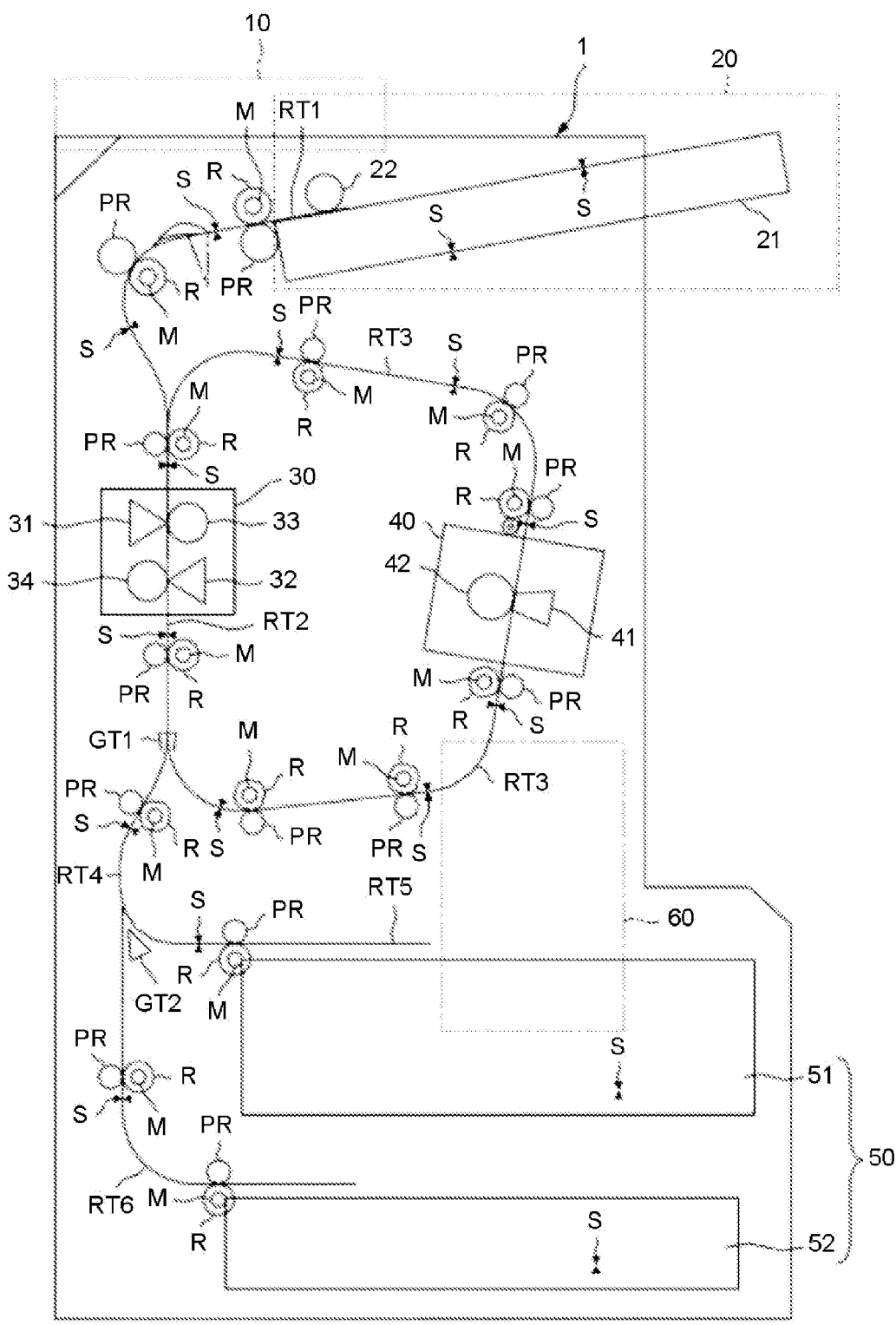
FIG. 1 is a cross-sectional view illustrating an example of the constitution of a color erasing apparatus 1 according to one embodiment.

FIG. 1. is a cross-sectional view illustrating an example of the constitution of the color erasing apparatus 1 according to the embodiment.

The color erasing apparatus 1 erases the color of the image formed on a sheet with color erasable recording agent (for example, color erasable toner, color erasable ink, color erasable ink ribbon and the like). In the present embodiment, toner is used as the color erasable recording agent. Paper, film and the like may be listed as one example of the sheet. The "color-erasing" mentioned herein refers to changing the color of the image formed with the color erasable recording agent to reduce the visibility of the image. The color-erased sheet can be reused. For example, the color-erased sheet can be reused as a sheet to be formed with an image by the image forming apparatus.

The color erasing apparatus 1 comprises a control panel 10, a paper feed section 20, a reading section 30, a color erasing section 40, a paper discharge section 50 and a control section 60. The color erasing apparatus 1 conveys the sheet loaded in the paper feed section 20 to the color erasing section 40. The color erasing apparatus 1 erases the color of the image on the sheet conveyed to the color erasing section 40. Then, the color erasing apparatus 1 discharges the color-erased sheet to the paper discharge section 50.

The color erasing apparatus 1 is provided with conveyance paths RT1~RT6. The conveyance paths RT1~RT6 convey the paper in the color erasing apparatus 1. A plurality of motors M, a plurality of conveyance rollers R, a plurality of platen rollers PR and a plurality of sensors S are arranged on the conveyance paths RT1~RT6.

The motor M drives the conveyance roller R. The driven conveyance roller R conveys the sheet. The platen roller PR is arranged opposite to the conveyance roller R to press the sheet so that the sheet is properly conveyed. The sheet is conveyed along the conveyance paths RT1~RT6 by the conveyance roller R and the platen roller PR.

The sensor S detects the existence of the sheet. The position of the sheet in the color erasing apparatus 1 is detected by the sensor S.

The control panel 10 functions as a user interface. The control panel 10 is provided with an operation section and a display section. The operation section of the control panel 10 receives an operation instruction of the color erasing apparatus 1 based on the operation carried out by an operator. The display section of the control panel 10 displays information to the operator.

The paper feed section 20 is provided with a paper feed tray 21, a paper feed roller 22 and a sensor S.

The paper feed tray 21 is a table for loading the sheet to be subjected to color erasing processing. The sheet to be subjected to color erasing processing is a sheet on which an image is formed with color erasable recording agent. The paper feed roller 22 feeds the sheets, one by one, loaded on the paper feed tray 21 to the conveyance path RT1.

The reading section 30 detects the state of the sheet conveyed by the conveyance path RT2. A specific example of the reading section 30 is described below. The reading section 30 comprises a line scanner 31, a line scanner 32 and platen rollers. The reading section 30 captures the image formed on the front side of the sheet and the image formed on the back side of the sheet.

The color erasing section 40 executes a processing (hereinafter referred to as "color erasing processing") of erasing the color of image on the sheet conveyed on the conveyance path RT3. A specific example of the color erasing section 40 is described below. The color erasing section 40 is provided with a thermal head 41 and a platen roller. The thermal head 41 of the color erasing section 40 has a plurality of heat generating elements. The color erasing section 40 erases the color of the image formed on the front side of the sheet and the image formed on the back side of the sheet based on the heat generated by the heat generating elements. In addition, the color-erased image is an image formed with the color erasable recording agent.

The paper discharge section 50 discharges the sheet conveyed on the conveyance path RT4 through the conveyance path RT5 or the conveyance path RT6. The paper discharge section 50 includes a reuse tray 51 and a reject tray 52. The reuse tray 51 stores the sheet discharged through the conveyance path RT5. The reject tray 52 stores the sheet discharged through the conveyance path RT6.

The reuse tray 51 is a stocker for storing a reusable sheet. The reject tray 52 is a stocker for storing a not-reusable sheet.

One end of the conveyance path RT1 is connected with the paper feed tray 21. The other end of the conveyance path RT1 is connected with the conveyance path RT2. The conveyance path RT1 guides the sheet fed by the paper feed section 20 to the conveyance path RT2.

One end of the conveyance path RT2 is connected with the conveyance path RT1. The other end of the conveyance path RT2 is connected with a branch point of the conveyance path RT3 and the conveyance path RT4. The reading section 30 is arranged in the middle of the conveyance path RT2. The conveyance path RT2 feeds the sheet passing the conveyance path RT1 to the reading section 30. The conveyance path RT2 guides the sheet passing through the reading section 30 to the conveyance path RT3 or the conveyance path RT4. In the following description, the conveyance path RT2 is referred to as a first conveyance path as needed.

Agate GT1 is arranged at the branch point of the conveyance path RT3 and the conveyance path RT4. The gate GT1 switches the conveyance path of the sheet conveyed by the conveyance path RT2 to either of the conveyance path RT3 and the conveyance path RT4. In a case of carrying out color erasing processing on the sheet conveyed on the conveyance path RT2, the gate GT1 guides the sheet to the conveyance path RT3 based on the control of the control section 60. In a case of discharging the sheet conveyed on the conveyance path RT2, the gate GT1 guides the sheet to the conveyance path RT4 based on the control of the control section 60.

One end of the conveyance path RT3 is connected with the conveyance path RT2 through the gate GT1. The other end of the conveyance path RT3 is connected with the conveyance path RT2. The color erasing section 40 is arranged in the middle of the conveyance path RT3. The conveyance path RT3 feeds the sheet passing the conveyance path RT2 to the color erasing section 40. The conveyance path RT3 guides the sheet passing through the color erasing section 40 to the conveyance path RT2. In the following description, the conveyance path RT3 is referred to as a second conveyance path as needed.

One end of the conveyance path RT4 is connected with the conveyance path RT2 through the gate GT1. The other end of the conveyance path RT4 is connected with the branch point of the conveyance path RT5 and the conveyance path RT6. The conveyance path RT4 guides the sheet passing the conveyance path RT2 to the conveyance path RT5 or the conveyance path RT6.

Agate GT2 is arranged at the branch point of the conveyance path RT5 and the conveyance path RT6. The gate GT2 switches the conveyance path of the sheet conveyed by the conveyance path RT4 to either of the conveyance path RT5 and the conveyance path RT6. If the sheet conveyed on the conveyance path RT4 is a reusable sheet, the gate GT2 guides the sheet to the conveyance path RT5 based on the control of the control section 60. If the sheet conveyed on the conveyance path RT4 is a not-reusable sheet, the gate GT2 guides the sheet to the conveyance path RT6 based on the control of the control section 60.

One end of the conveyance path RT5 is connected with the conveyance path RT4 through the gate GT2. The other end of the conveyance path RT5 is connected with the reuse tray 51. The conveyance path RT5 guides the sheet passing the conveyance path RT4 to the reuse tray 51.

One end of the conveyance path RT6 is connected with the conveyance path RT4 through the gate GT2. The other end of the conveyance path RT6 is connected with the reject tray 52. The conveyance path RT6 guides the sheet passing the conveyance path RT4 to the reject tray 52.

Figure 2:
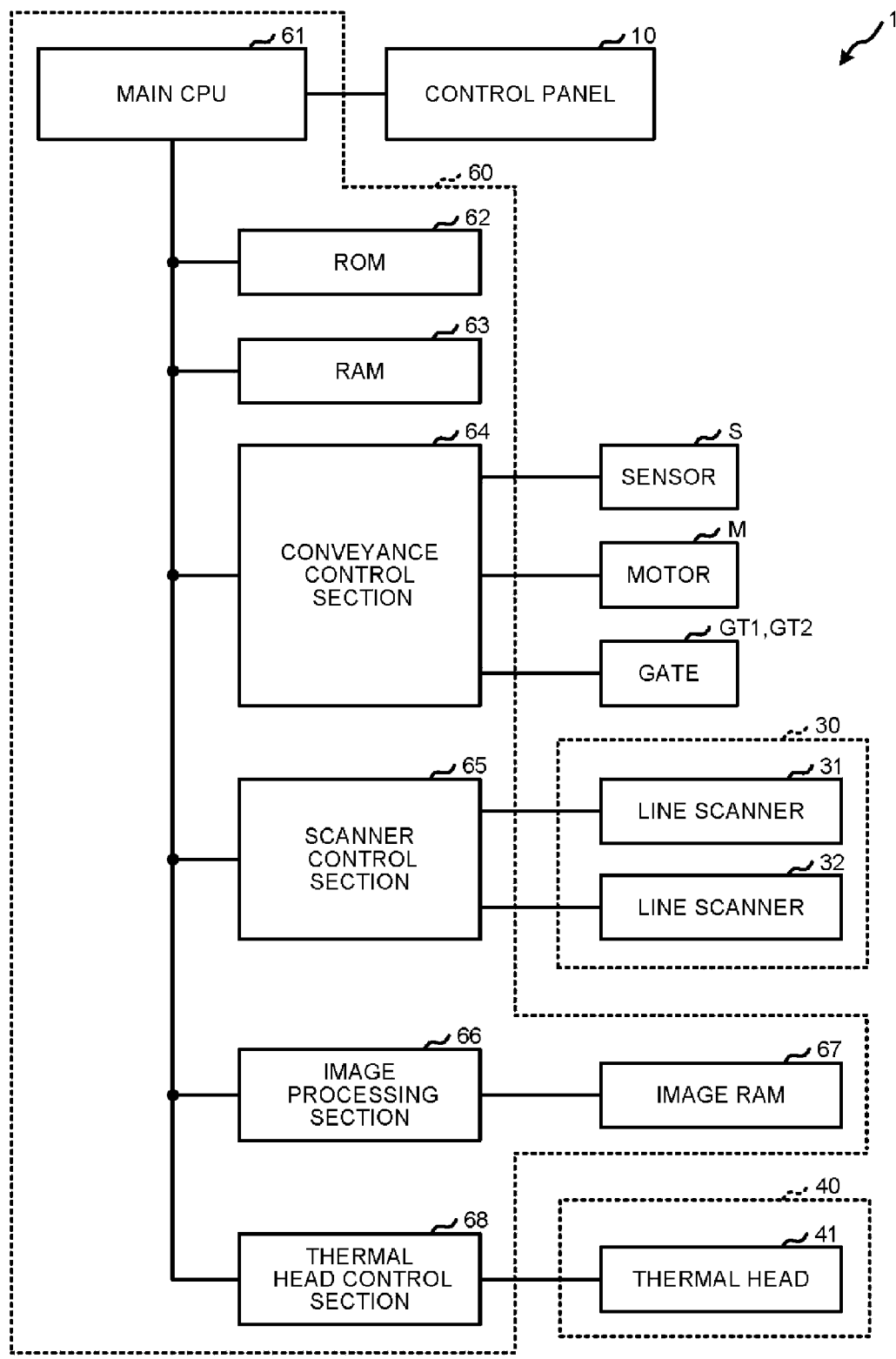
FIG. 2 is a block diagram illustrating an example of the constitution of the functions of the color erasing apparatus 1 according to the embodiment.

FIG. 2 is a block diagram illustrating an example of the functional constitution of color erasing apparatus 1 according to the embodiment.

The control section 60 comprises a main CPU (Central Processing Unit) 61, a ROM (Read Only Memory) 62, a RAM (Random Access Memory) 63, a conveyance control section 64, a scanner control section 65, an image processing section 66, an image RAM 67 and a thermal head control section 68. The control section 60 controls the control panel 10, the plurality of sensors S, the plurality of motors M, the plurality of gates (GT1 and GT2), the reading section 30 and the color erasing section 40.

The main CPU 61 uniformly controls the color erasing apparatus 1. The main CPU 61 executes programs to execute various processing. The main CPU 61 acquires an instruction input by the operator from the control panel 10. The main CPU 61 executes control processing based on the acquired operation instruction. The main CPU 61 displays a processing result and the information relating to the next operation on the control panel 10.

The ROM 62, which is a non-volatile memory, stores the program for executing the control processing, the control data and the like.

The RAM 63, which is a volatile memory, functions as a working memory and a buffer memory. The RAM 63 temporarily stores the data used in the processing carried out by the control section 60.

The conveyance control section 64 controls the conveyance of the sheet in the color erasing apparatus 1. A specific example of the processing carried out by the conveyance control section 64 is described below. The conveyance control section 64 detects the position of the sheet in the color erasing apparatus 1 based on the output of the plurality of sensors S. The conveyance control section 64 outputs the detection result indicating the position of the sheet to the main CPU 61.

The conveyance control section 64 controls the driving of the plurality of motors M and the gates (GT1 and GT2) in response to the instruction of the main CPU 61. For example, the conveyance control section 64 drives the motor M to rotate the paper feed roller 22 in response to a start instruction of the color erasing processing received from the main CPU 61. The sheet loaded on the paper feed tray 21 is fed through the rotation of the paper feed roller 22.

The conveyance control section 64 may control the driving of a plurality of motors M based on the detection result indicating the position of the sheet. For example, the conveyance control section 64 drives the motors M to rotate a plurality of conveyance rollers R in response to the position of the sheet. The sheet is conveyed on the conveyance path through the rotation of the conveyance roller R.

The scanner control section 65 controls the line scanner 31 and the line scanner 32 in response to the instruction received from the main CPU 61 if the sheet is conveyed to the reading section 30. For example, the scanner control section 65 operates the line scanner 31 and the line scanner 32 to acquire the image data representing the image on the sheet. For example, the image data of the front side of the sheet is acquired through the operation of the line scanner 31, and the image data of the back side of the sheet is acquired through the operation of the line scanner 32. The scanner control section 65 outputs the acquired image data to the image processing section 66.

The image processing section 66 acquires the image data output by the scanner control section 65 and stores the acquired image data in the image RAM 67. The image processing section 66 reads the image data from the image RAM 67. The image processing section 66 generates pattern data which will be used in the image color-erasing processing of the color erasing section 40 based on the read image data of the front side and the image data of the backside. The image processing section 66 stores the generated pattern data in the image RAM 67.

The pattern data is used when the thermal head 41 is driven. The pattern data contains, for example, color erasing data for controlling the heat generation for each of the plurality of heat generating elements of the thermal head 41. The color erasing data is the information indicating whether or not there is an image formed at the position. For example, the color erasing data indicates whether or not there is image data to be subjected to color erasing processing for each unit block arranged on the sheet.

The image processing section 66 reads the pattern data from the image RAM 67 based on the instruction of the main CPU 61. The image processing section 66 outputs the read pattern data to the thermal head control section 68.

The image processing section 66 determines whether the image is formed with the color erasable recording agent or the color inerasable recording agent based on the image data. The image processing section 66 outputs the determination result to the main CPU 61. For example, in a case in which a given image determined in advance exists in a given area (hereinafter referred to as "detection target area") determined in advance, the image processing section 66 determines that the image is formed with the color erasable recording agent. In this case, the main CPU 61 determines to execute the color erasing processing. On the other hand, in a case in which the given image determined in advance does not exist in the detection target area, the image processing section 66 determines that the image is not formed with the color erasable recording agent. In this case, the main CPU 61 determines not to execute the color erasing processing.

The image RAM 67 is a storage section for storing the image data and the pattern data processed by the image processing section 66.

The thermal head control section 68 controls the thermal head 41 of the color erasing section 40 based on the pattern data. The thermal head control section 68 detects that the sheet is conveyed to the color erasing section 40 according to the output of the sensor S. The thermal head control section 68 drives the thermal head 41 in response to the instruction received from the main CPU 61. In a case of driving the thermal head 41 to carry out color erasing processing, the thermal head control section 68 controls the heat generation of the plurality of heat generating elements based on the pattern data. The color erasable recording agent is heated by the heat generating elements and the color of the image at the heated position is erased.

Figure 3:
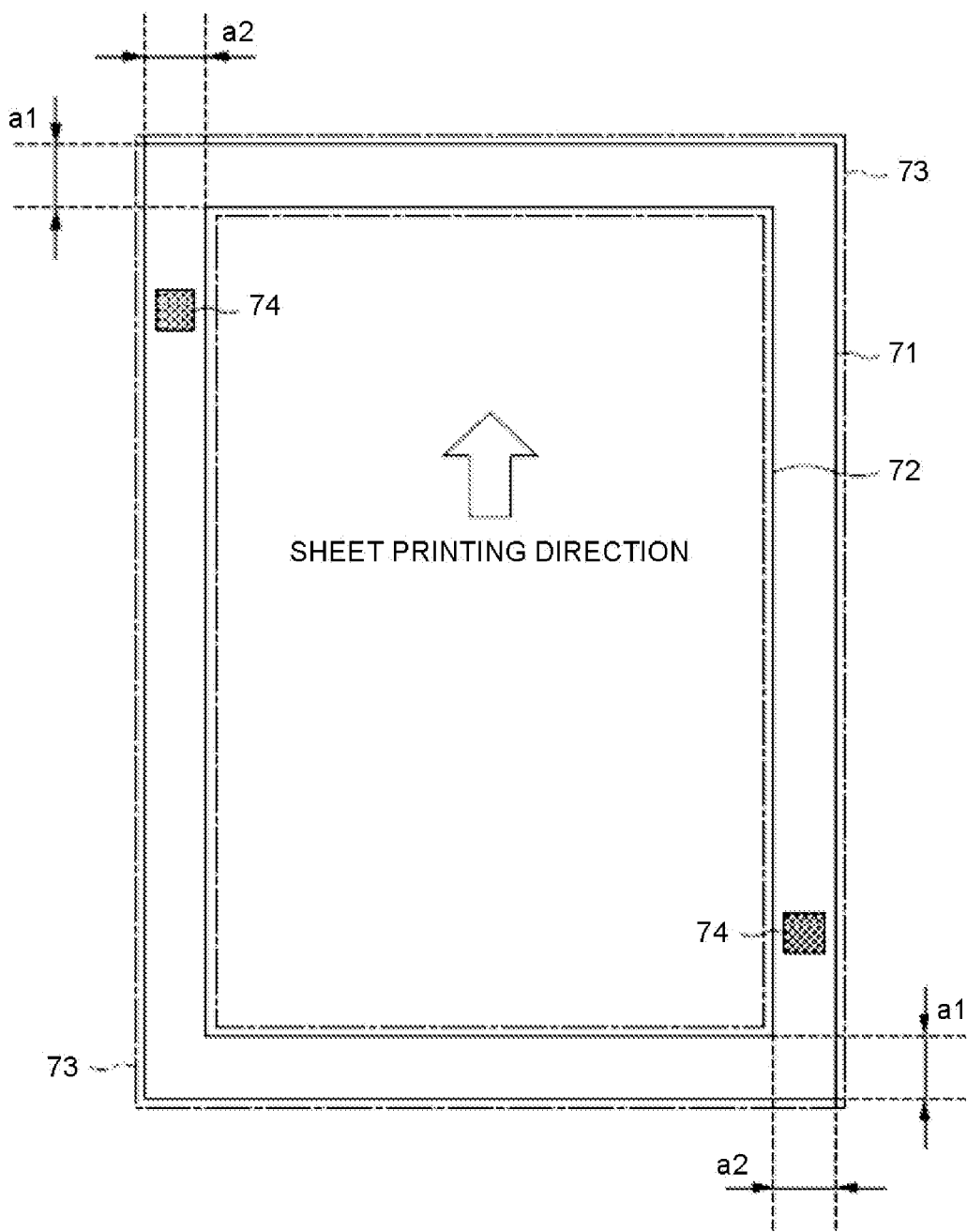
FIG. 3 is a diagram illustrating a specific example of a sheet on which an image is formed with color erasable recording agent.

FIG. 3 is a diagram illustrating a specific example of a sheet on which an image is formed with the color erasable recording agent. An image forming area 72 located inside the sheet 71 represents a range in which an image relating to actual data is formed by an image forming apparatus for forming an image on a sheet with color erasable recording agent. The image forming apparatus forms an image relating to actual data in the image forming area 72. In addition, the image forming apparatus is also capable of forming an image outside the image forming area 72. Thus, an image relating to a header and a footer may be formed outside the image forming area 72.

The given image 74 determined in advance exists in a detection target area 73 of the sheet the image on which is erased by the color erasing apparatus 1. In FIG. 3, the detection target area 73 is arranged as an area on the sheet 71 but outside the image forming area 72.

Figure 4:
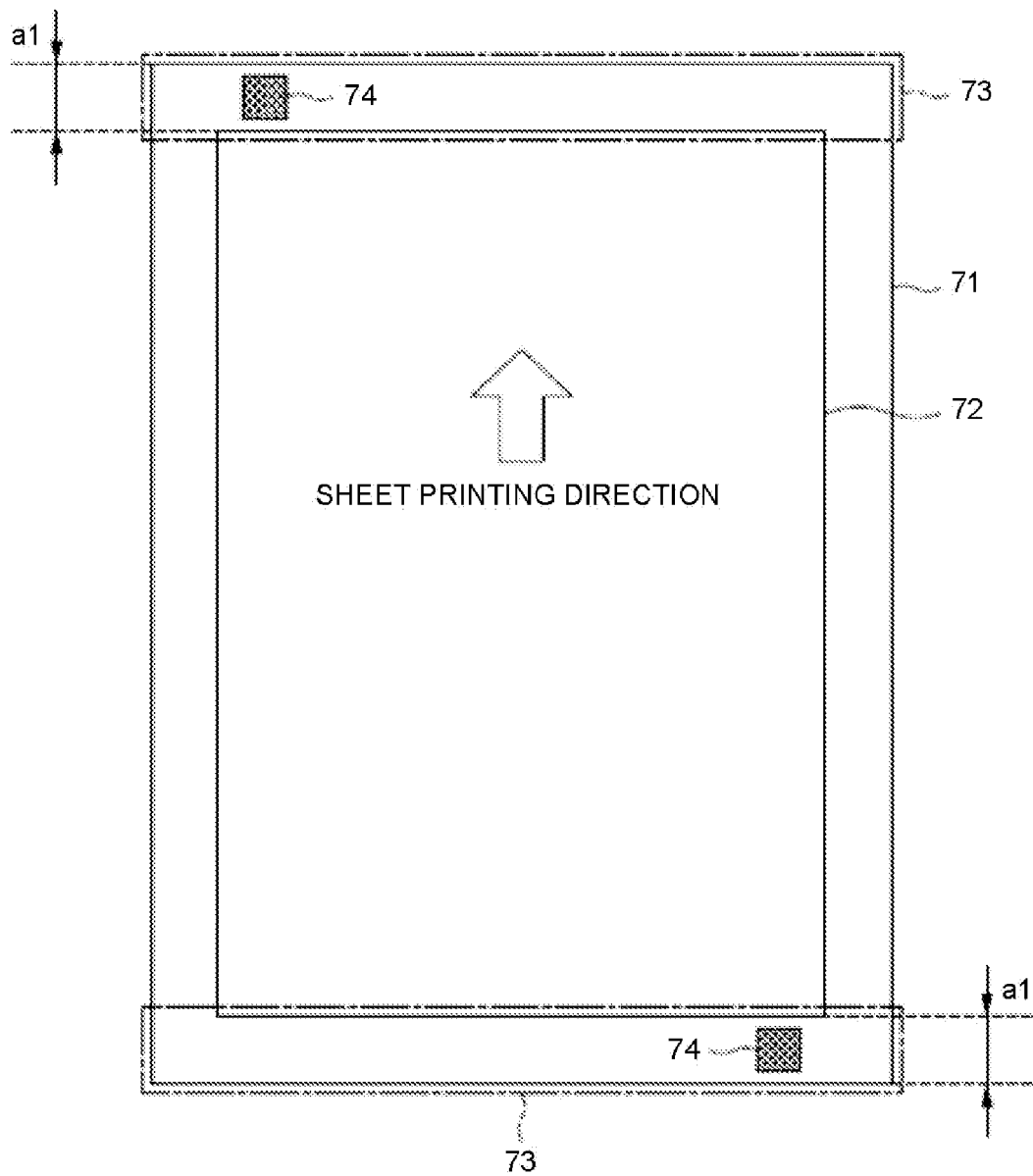
FIG. 4 is a diagram illustrating a specific example of a sheet on which an image is formed with color erasable recording agent.

FIG. 4 is a diagram illustrating a specific example of a sheet on which an image is formed with the color erasable recording agent. In FIG. 4, the detection target areas 73 are arranged at the front and the rear end in the conveyance direction of the sheet in the color erasing apparatus 1. The given image 74 is formed in the detection target area 73. In FIG. 4, one detection target area 73 is defined as an area surrounded by a side (hereinafter referred to as "front end side") located at the front end in the conveyance direction of the sheet, a side which is positioned at a distance of a1 away from the front end side and is parallel to the front end side, a right side and a left side in the conveyance direction of the sheet. In FIG. 4, another detection target area 73 is defined as an area surrounded by a side (hereinafter referred to as "rear end side") located at the rear end in the conveyance direction of the sheet, a side which is positioned at a distance of a1 away from the rear end side and is parallel to the rear end side, a right side and a left side in the conveyance direction of the sheet.

Figures 5, 6:
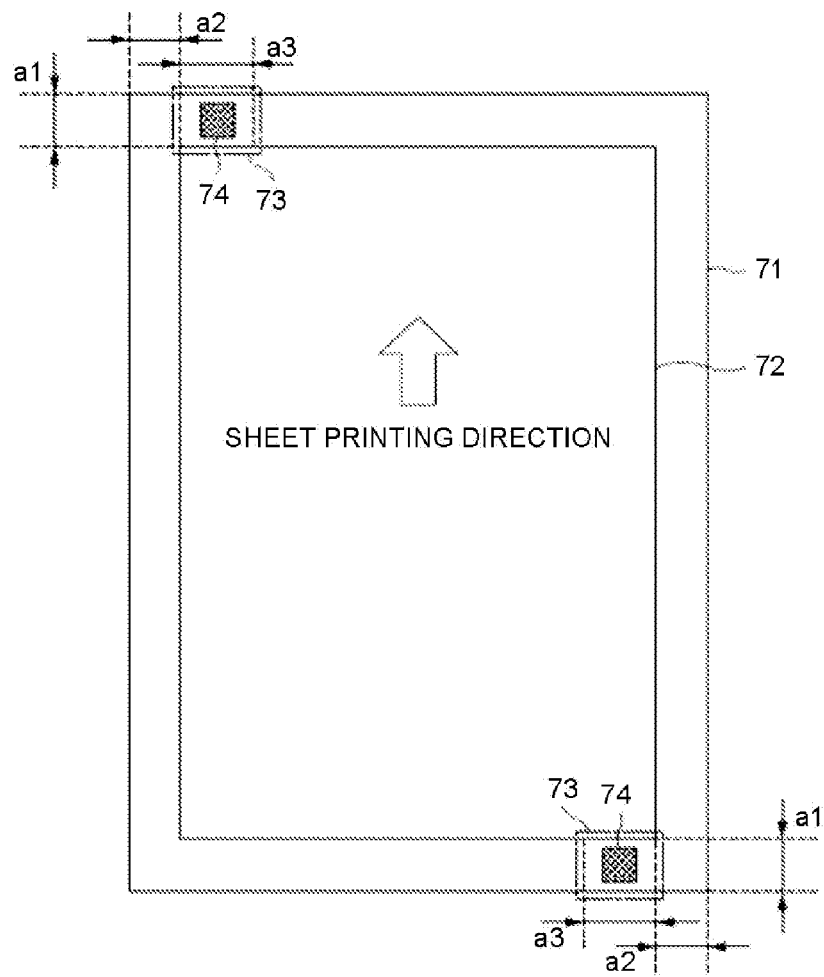
FIG. 5 is a diagram illustrating a specific example of a sheet on which an image is formed with color erasable recording agent.
FIG. 6 is a diagram illustrating a specific example of a color difference table used when an image processing section 66 detects a given image 74.

FIG. 5 is a diagram illustrating a specific example of a sheet on which an image is formed with the color erasable recording agent. In FIG. 5, the detection target areas 73 are defined in a more restrictive manner. In FIG. 5, one detection target area 73 is defined as an area surrounded by the front end side, a side which is positioned at a distance of a1 away from the front end side and is parallel to the front end side, a side which is positioned at a distance of a2 away from the left side in the conveyance direction of the sheet and is parallel to the left side, and a side which is positioned at a distance of (a2+a3) away from the left side in the conveyance direction of the sheet and is parallel to the left side. In FIG. 5, another detection target area 73 is defined as an area surrounded by the rear end side, a side which is positioned at a distance of a1 away from the rear end side and is parallel to the rear end side, a side which is positioned at a distance of a2 away from the right side in the conveyance direction of the sheet and is parallel to the right side, and a side which is positioned at a distance of (a2+a3) away from the right side in the conveyance direction of the sheet and is parallel to the right side.

FIG. 6 is a diagram illustrating a specific example of a color difference table used when the image processing section 66 detects the given image 74. The image processing section 66 detects the given image 74 in a case where the color difference between the color of the sheet and the color of the given image 74 is greater than a threshold value. The color difference table displays the preset threshold value of the color difference for each color of the sheet.

For example, the color difference table includes a plurality of records 91. The record 91 includes the values of the color of a sheet and the threshold value. The value of the color of a sheet represents the color of the part on the sheet where no image is formed. The threshold value represents the threshold value of the color difference when the image formed on the sheet having a color of the sheet of the same record 91 is recognized as an image. For example, in a case where the color difference between the color of a certain area on a white sheet and the color of the sheet is greater than t1, the image processing section 66 determines the area as a part where an image exists. For example, in a case where the color difference between the color of a certain area on a white sheet and the color of the sheet is less than t1, the image processing section 66 determines the area as a part where the color is the color of the sheet.

Figure 7:
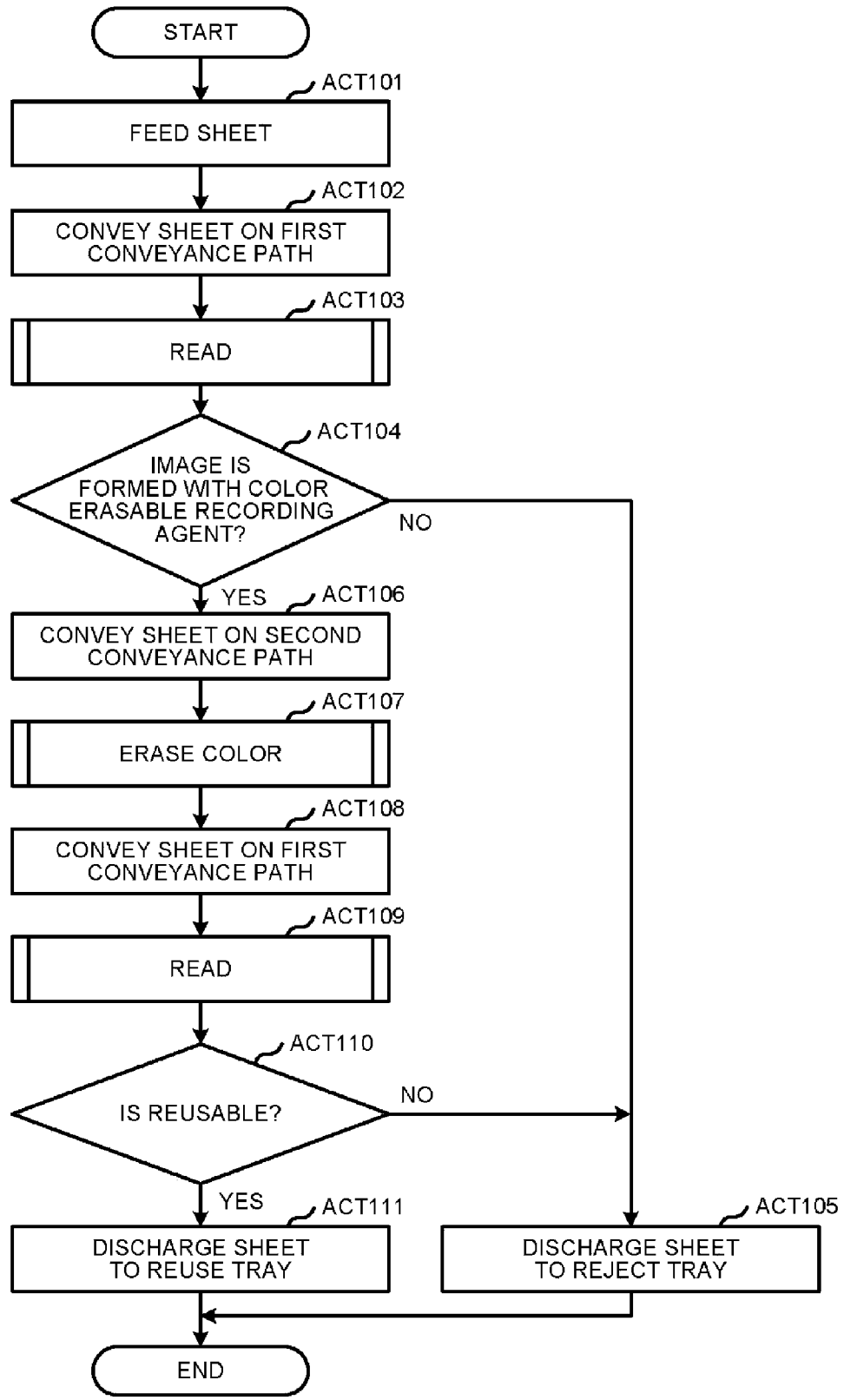
FIG. 7 is a flowchart illustrating a first specific example of the operations carried out by the color erasing apparatus 1.

FIG. 7 is a flowchart illustrating a first specific example of the operations carried out by the color erasing apparatus 1. First, the paper feed section 20 feeds a sheet (ACT 101). Next, the conveyance path RT1 conveys the sheet. Then, the first conveyance path (conveyance path RT2) conveys the sheet conveyed by the conveyance path RT1 to the reading section 30 (ACT 102). The reading section 30 reads the images on the front side and the back side of the conveyed sheet to acquire image data (ACT 103).

The image processing section 66 determines whether or not the image is formed with color erasable recording agent based on the acquired image data (ACT 104). If the image is not formed with color erasable recording agent (NO in ACT 104), the main CPU 61 determines not to carry out color erasing processing. In response to the determination, the main CPU 61 discharges the sheet passing through the reading section 30 to the reject tray (ACT 105). Specifically, the main CPU 61 carries out the following operations.

The main CPU 61 controls the gate GT1 so that the sheet passing through the reading section 30 is conveyed to the conveyance path RT4. The gate GT1 guides the sheet conveyed on the conveyance path RT2 to the conveyance path RT4 in response to the control of the main CPU 61. Then the main CPU 61 controls the gate GT2 so that the sheet passing the conveyance path RT4 is conveyed to the conveyance path RT6. The gate GT2 guides the sheet conveyed on the conveyance path RT4 to the conveyance path RT6 in response to the control of the main CPU 61. The sheet conveyed on the conveyance path RT6 is discharged to the reject tray 52.

In the operation in ACT 104, if the image is formed with color erasable recording agent (YES in ACT 104), the main CPU 61 determines to carry out color erasing processing. In response to the determination, the main CPU 61 conveys the sheet passing through the reading section 30 to the second conveyance path (conveyance path RT3) (ACT 106). Specifically, the main CPU 61 carries out the following operations.

The main CPU 61 controls the gate GT1 so that the sheet passing through the reading section 30 is conveyed to the conveyance path RT3. The gate GT1 guides the sheet conveyed on the conveyance path RT2 to the conveyance path RT3 in response to the control of the main CPU 61.

Next, the second conveyance path (conveyance path RT3) conveys the sheet conveyed by the first conveyance path (conveyance path RT2) to the color erasing section 40. The color erasing section 40 erases the color of the image on the conveyed sheet (ACT 107). The second conveyance path (conveyance path RT3) guides the sheet passing through the color erasing section 40 to the first conveyance path (conveyance path RT2). The first conveyance path (conveyance path RT2) conveys the sheet conveyed by the second conveyance path (conveyance path RT3) to the reading section 30 (ACT 108). The reading section 30 reads the images on the front side and the back side of the conveyed sheet to acquire image data (ACT 109).

The main CPU 61 determines whether or not the conveyed sheet is reusable based on the acquired image data (ACT 110). For example, the main CPU 61 calculates the percentage of the area, of which the color difference with the color of the sheet is greater than a first given value, in the area of the sheet. If the calculated percentage is less than a second given value, the main CPU 61 determines that the sheet is reusable. On the other hand, if the calculated percentage is greater than the second given value, the main CPU 61 determines that the sheet is not reusable.

If the sheet is determined to be not reusable (NO in ACT 110), the main CPU 61 discharges the sheet passing through the reading section 30 to the reject tray (ACT 105).

If the sheet is determined to reusable (YES in ACT 110), the main CPU 61 discharges the sheet passing through the reading section 30 to the reuse tray (ACT 111). Specifically, the main CPU 61 carries out the following operations.

The main CPU 61 controls the gate GT1 so that the sheet passing through the reading section 30 is conveyed to the conveyance path RT4. The gate GT1 guides the sheet conveyed on the conveyance path RT2 to the conveyance path RT4 in response to the control of the main CPU 61. Then the main CPU 61 controls the gate GT2 so that the sheet passing the conveyance path RT4 is conveyed to the conveyance path RT5. The gate GT2 guides the sheet conveyed on the conveyance path RT4 to the conveyance path RT5 in response to the control of the main CPU 61. The sheet conveyed on the conveyance path RT5 is discharged to the reuse tray 51.

Figure 8:
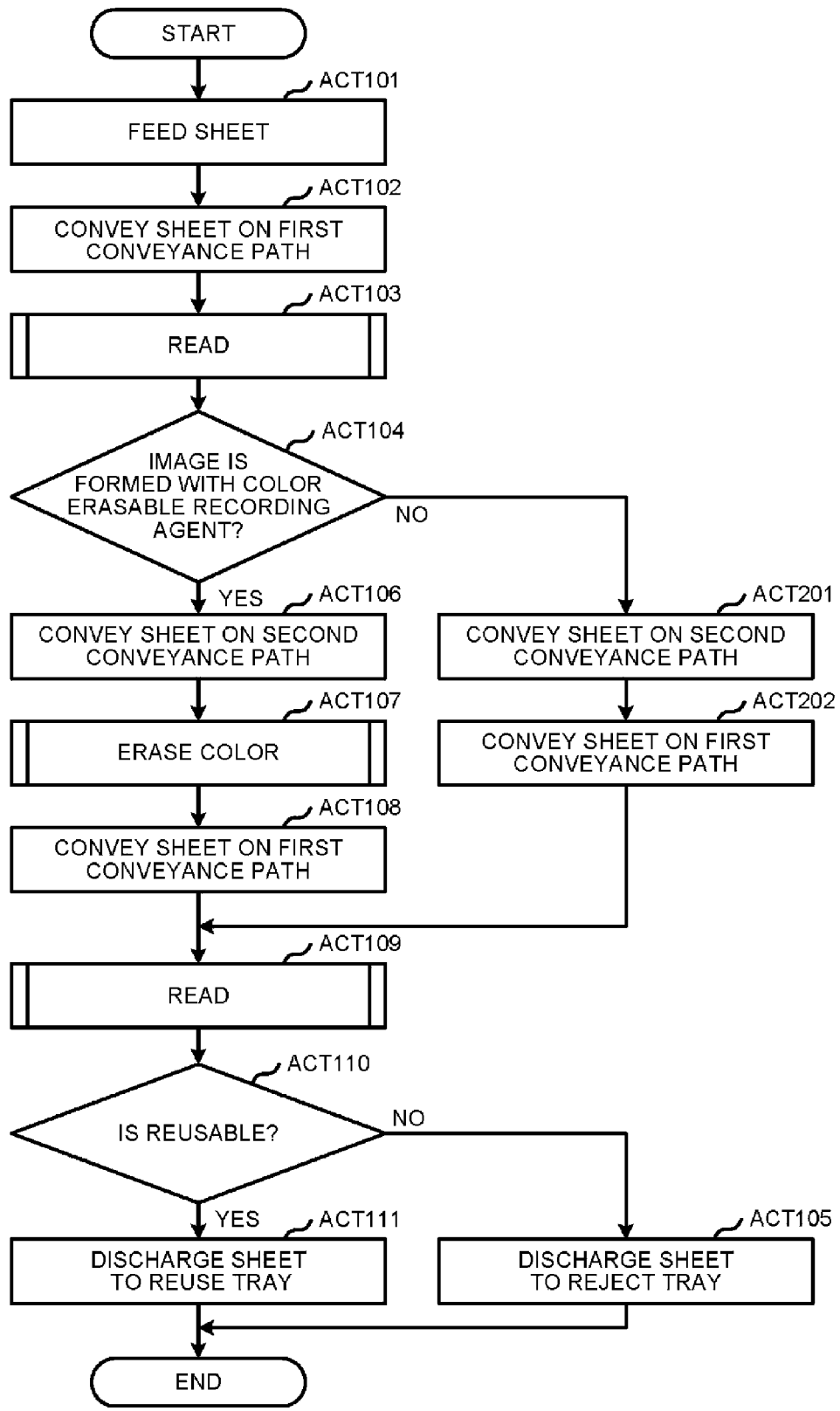
FIG. 8 is a flowchart illustrating a second specific example of the operations carried out by the color erasing apparatus 1.

FIG. 8 is a flowchart illustrating a second specific example of the operations carried out by the color erasing apparatus 1. Compared with the flow of the processing in the first specific example, the flow of the processing in the second specific example is different in the processing (ACT 201 and ACT 202) in a case where the image is not formed with color erasable recording agent, and the rest of the processing is the same as that in the first specific example. Therefore, only the point different from the first specific example is described.

In a case where the image on the sheet is not an image formed with color erasable recording agent (NO in ACT 104), the main CPU 61 determines not to carry out color erasing processing. In response to the determination, the main CPU 61 conveys the sheet on the second conveyance path (conveyance path RT3) in a mode different from the color-erasing mode.

There is a plurality of embodiments for the conveyance in the mode different from the color-erasing mode. A first embodiment and a second embodiment are described below.

(A First Embodiment)

The main CPU 61 controls the gate GT1 so that the sheet passing through the reading section 30 is conveyed to the second conveyance path (conveyance path RT3). The gate GT1 guides the sheet conveyed on the conveyance path RT2 to the second conveyance path (conveyance path RT3) in response to the control of the main CPU 61. Then, the second conveyance path (conveyance path RT3) conveys the sheet conveyed by the first conveyance path (conveyance path RT2) to the color erasing section 40.

The main CPU 61 instructs the thermal head control section 68 to carry out a control so that the temperature of the thermal head 41 is lower than the fixing temperature of the color inerasable recording agent. The thermal head control section 68 controls to lower the temperature of the thermal head 41 in response to the instruction of the main CPU 61. In this case, the offset due to the recording agent which forms an image on the conveyed sheet is not caused.

Then, the second conveyance path (conveyance path RT3) guides the sheet passing through the color erasing section 40 to the first conveyance path (conveyance path RT2). The first conveyance path (conveyance path RT2) conveys the sheet conveyed by the second conveyance path (conveyance path RT3) to the reading section 30 (ACT 202). The reading section 30 reads the images on the front side and the back side of the conveyed sheet to acquire image data (ACT 109). The following processing is the same as that in the first specific example.

(A Second Embodiment)

The main CPU 61 controls the gate GT1 so that the sheet passing through the reading section 30 is conveyed to the second conveyance path (conveyance path RT3). The gate GT1 guides the sheet conveyed on the conveyance path RT2 to the second conveyance path (conveyance path RT3) in response to the control of the main CPU 61. Then, the second conveyance path (conveyance path RT3) conveys the sheet conveyed by the first conveyance path (conveyance path RT2) to the color erasing section 40.

The main CPU 61 instructs the conveyance control section 64 to carry out a control so that the rotation speed of the conveyance roller R based on the driving of the motor M is faster than the general speed. The rotation speed of the conveyance roller R is controlled so that the heat capacity per unit time applied to the sheet by the thermal head 41 of the color erasing section 40 is a value at which the fixation of the recording agent forming the image on the conveyed sheet does not occur. The conveyance control section 64 controls the driving of the motor M in response to the instruction of the main CPU 61 so that the conveyance speed of the sheet becomes faster. In this case, the offset due to the recording agent which forms the image on the conveyed sheet is not caused.

Then, the second conveyance path (conveyance path RT3) guides the sheet passing through the color erasing section 40 to the first conveyance path (conveyance path RT2). The first conveyance path (conveyance path RT2) conveys the sheet conveyed by the second conveyance path (conveyance path RT3) to the reading section 30 (ACT 202). The reading section 30 reads the images on the front side and the back side of the conveyed sheet to acquire image data (ACT 109). The following processing is the same as that in the first specific example.

In the color erasing apparatus 1 with such a constitution, it is determined whether or not the image formed on the sheet to be subjected to color erasing processing is an image formed with color erasable recording agent. In a case where the image is not an image formed with color erasable recording agent, the color erasing apparatus 1 carries out a control so as not to carry out color erasing processing on the sheet. Then the color erasing apparatus 1 discharges the sheet to the reject tray 52. Thus, it is possible to reduce the occurrence of offset caused by the sheet on which an image is formed with recording agent containing color inerasable coloring agent.

Further, in the color erasing apparatus 1, the determination on whether or not the image is formed with color erasable recording agent is carried out based on a determination on whether or not there is a given image in the pre-determined detection target area. The detection target area is arranged at the front end part in the conveyance direction of the sheet. Thus, it is possible to determine whether or not to carry out color erasing processing at timing earlier than the convey-ance. Further, the detection target area is also arranged at the rear end part in the conveyance direction of the sheet. Thus, it is possible to determine whether or not to carry out color erasing processing at timing earlier than the conveyance even if the front end part and the rear end part of the sheet are set incorrectly in the conveyance direction.

In the color erasing apparatus 1, the threshold value of the color difference for each color of sheet is used when the given image 74 is detected in the detection target area. Thus, it is possible to prevent that the given image 74 in the detection target area is not detected by mistake no matter whether or not the image is formed with color erasable recording agent. For example, in a case where the color of the sheet is dark color, compared with the case where the color of the sheet is white, the color difference between the color of the given image 74 and the color of the sheet is small. Therefore, if the threshold value of the color difference used in the case where the color of the sheet is white is applied to this case, there exists a possibility that the given image 74 cannot be detected. However, in the color erasing apparatus 1, such a problem is solved because the threshold value of the color difference for each color of sheet is set as stated above.

Next, the color erasable recording agent mentioned above is described. In a case where the color erasable recording agent is toner, for example, the toner is manufactured in the following way.

The preparation of atomized solution containing binder resin: Pes (Polyester) resin with a glass transition temperature Tg of 50 degrees centigrade and a softening point of 100 degrees centigrade is used as the binder resin. The particle dispersion (atomized solution) containing binder resin is manufactured with a high pressure homogenize using 30 pts. mass of Pes resin, 3 pts. mass of anionic emulsifier (NEOPELEX G15, manufactured by Kao Corp.), 0.6 pts. mass of neutralizing agent (dimethylaminoethanol).

The preparation of release agent atomized solution: atomized solution is manufactured using 30 pts. mass of rice WAX using the same manufacturing method of the binder resin.

The preparation of coloring agent: heating and dissolving the component including 1 pts. mass of 3-(2-ethoxy-4-diethylaminophenyl)-3-(1-ethyl-2-methylindole-3-yl)-4-azaphthalide as the leuko dye; 5 pts. mass of 2,2-Bis(4-hydroxyphenyl) hexafluoropropane as color developing agent; and 50 pts. mass of diester compound of pimelic acid and 2-(4-benzyloxy-phenyl) ethanol as color erasing agent (temperature control agent); adding the mixture solution of 20 pts. mass of aromatic polyvalent Isocyanate prepolymer as encapsulating agent and 40 pts. mass of ethyl acetate to 250 pts. mass of 8% polyvinyl alcohol solution; and then emulsifying and dispersing the mixture solution. Next, after stirring for an hour at a temperature of 70 degrees centigrade, adding 2 pts. mass of water-soluble aliphatic modified amine as reactant, and then keeping the solution at 90 degrees centigrade and meanwhile stirring the solution for about three hours to obtain leuco capsule particle. Then, putting the capsule particle dispersion in a freezer (−30 degrees centigrade) to generate color, thereby obtaining blue coloring agent. The volume average particle diameter of the color generation particle C1 is 2 μm when measured by SALD7000 manufactured by Shimadzu Corporation.

The process of aggregation and fusion: aggregating 10 pts. mass of encapsulated coloring agent, 283 pts. mass of atomized solution containing binder resin, 17 pts. mass of release agent atomized solution using 100 pts. mass of aluminum sulfate [Al2 (SO4) 3] 5% solution at 45 degrees centigrade. Then, raising the temperature up to 65 degrees centigrade (temperature rising speed: 1 degree centigrade/min) and fusing, then rinsing and drying to obtain capsule color erasable toner. The amount of the coloring agent in the capsule color erasable toner is 10 mass %.

The complete color erasing temperature of the toner is degrees centigrade, and the color erasing starting temperature is 85 degrees centigrade, and further, the complete color generating temperature is −5 degrees centigrade.

Figure 9:
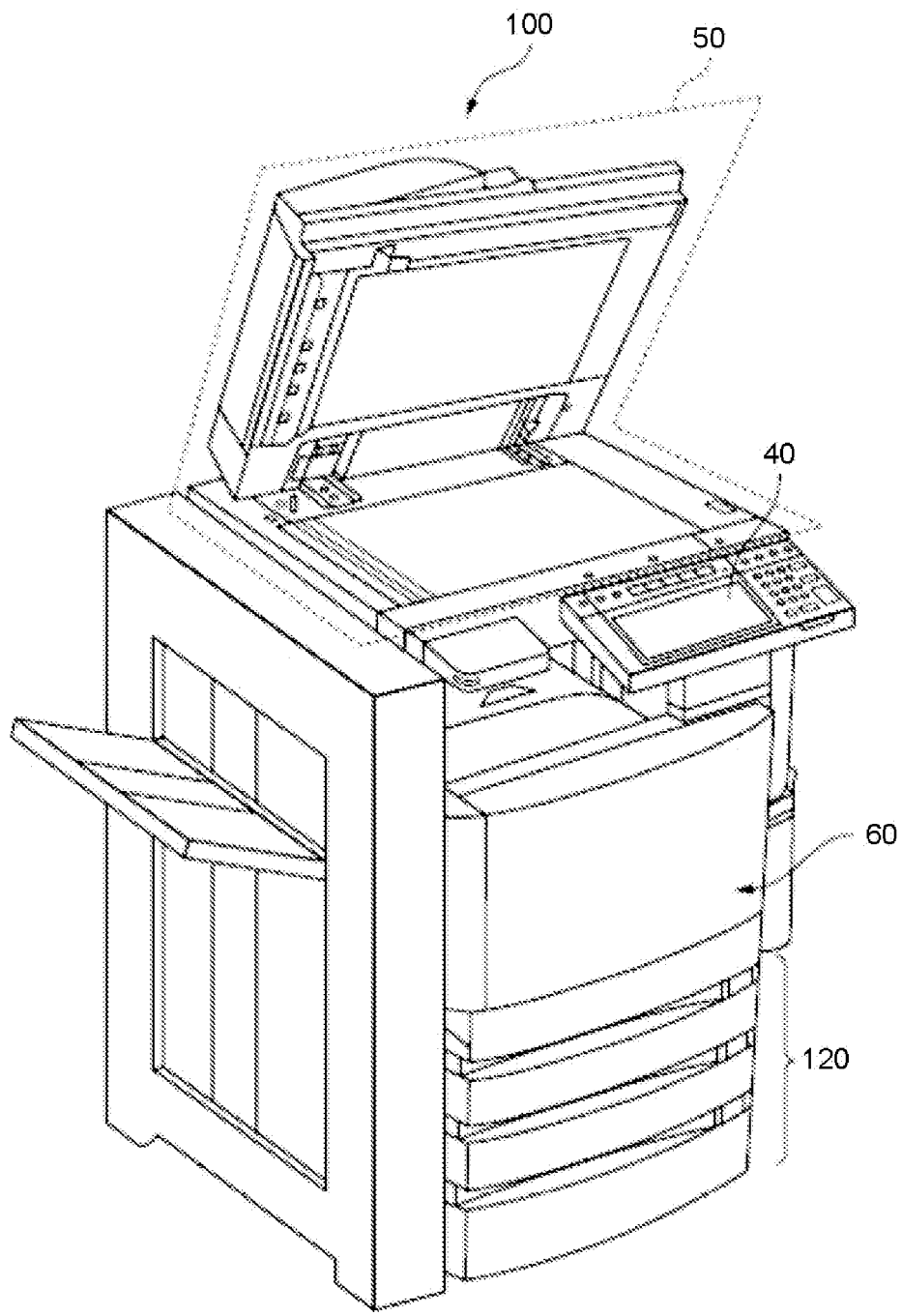
FIG. 9 is an external view illustrating an example of the constitution of an image forming apparatus 100.

Next, the image forming apparatus which carries out image formation with the color erasable recording agent described above is described. FIG. 9 is an external view illustrating one example of an image forming apparatus 100 according to the embodiment. The image forming apparatus 100 is, for example, a multi-function peripheral (MFP: Multifunction Printer). The image forming apparatus 100 reads the sheet to generate digital data (image file).

The image forming apparatus 100 comprises a display section 40, a scanner section 50, a print section 60 and a tray 120. The image forming apparatus 100, which is not limited to an image forming apparatus for fixing a toner image, may be an inkjet type image forming apparatus.

Figure 10:
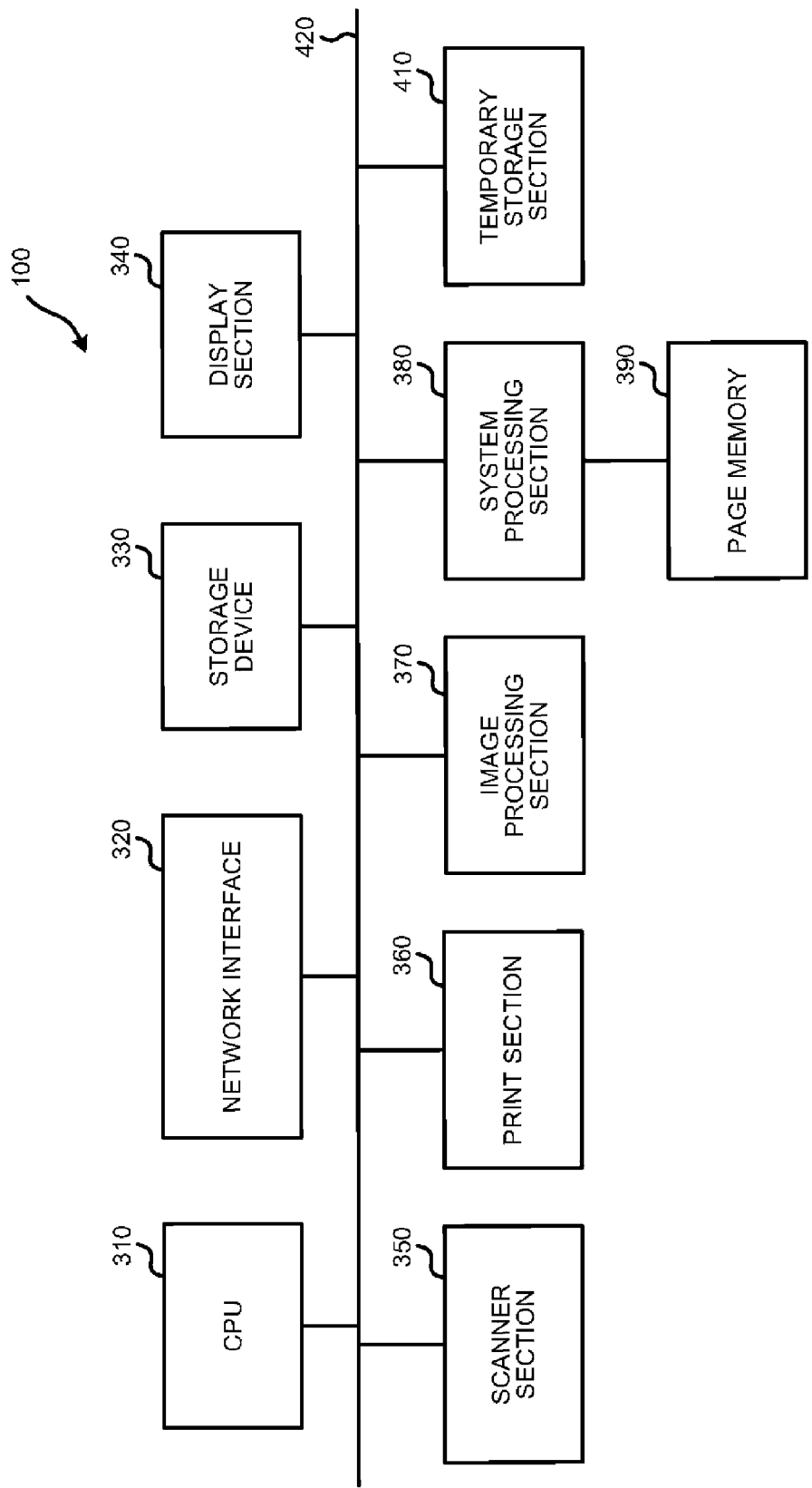
FIG. 10 is a block diagram illustrating an example of the functional constitution of the image forming apparatus 100.

FIG. 10 is a block diagram illustrating an example of the functional constitution of the image forming apparatus 100 according to the embodiment. The image forming apparatus 100 comprises a CPU (Central Processing Unit) 310, a network interface 320, a storage device 330, a display section 340, a scanner section 350, a print section 360, an image processing section 370, a system processing section 380, a page memory 390 and a temporary storage section 410. Each section of the image forming apparatus 100 is connected with each other through an internal bus line 420, and is capable of carrying out data input/output processing.

The CPU 310 operates, for example, as a control section, and controls the operation of each section of the image forming apparatus 100.

The network interface 320 carries out data transmission/reception with other apparatuses.

The storage device 330, which is, for example, a hard disk or a SSD (solid state drive), stores the data used by each section of the image forming apparatus 100.

The display section 340 is, for example, a liquid crystal display provided with a touch panel. The display section 340 operates as an output interface to display characters and images. The display section 340 may also operate as an input interface to receive an instruction input from a user.

The scanner section 350 is, for example, a color scanner provided with a Contact Image Sensor (CIS) and a Charge Coupled Devices (CCD) and the like. The scanner section 350 reads, with a sensor, an image formed on a sheet to generate digital data.

The print section 360 forms an image on the sheet with the color erasable recording agent.

The image processing section 370 carries out image processing on the digital data generated by the scanner section 350.

The system processing section 380 carries out DMA (Direct Memory Access) on the page memory 390.

The page memory 390 temporarily stores the digital data to be processed.

The temporary storage section 410 is, for example, a RAM (Random Access Memory), and temporarily stores the data used by each section of the image forming apparatus 100.

When carrying out image formation with color erasable recording agent, the image forming apparatus 100 with such a constitution forms the given image 74 in the detection target area 73, as shown in FIG. 3~FIG. 5.

Next, a modification of the color erasing apparatus is described. The main CPU 61 instructs the conveyance control section 64 not to convey the sheet further than the conveyance path RT2 until the determination in ACT 104 is completed. In this case, the conveyance control section 64 controls the rotation of the conveyance roller R so that the sheet is not conveyed further than the gate GT1 until the conveyance of the sheet is allowed. When the determination in ACT 104 is completed, the main CPU 61 instructs the conveyance control section 64 to continue the conveyance of the sheet. At this time, the main CPU 61 controls the conveyance path serving as a conveyance destination of the sheet in response to the determination result.

In accordance with at least one embodiment described above, the main CPU 61 is arranged to determine whether or not to carry out color erasing processing, thus, it is possible to reduce the occurrence of offset caused by the sheet on which an image is formed with recording agent containing color inerasable coloring agent.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A color erasing apparatus, comprising:
   a first conveyance roller configured to convey a sheet along a first conveyance path;
   a second conveyance roller configured to convey the sheet passing through the first conveyance path along a second conveyance path;
   a third conveyance roller configured to convey the sheet passing through the first conveyance path along a third conveyance path;
   a scanner configured to capture an image formed on the sheet passing the first conveyance path;
   a color erasing section configured to erase the color of an image formed on the sheet passing the second conveyance path with color erasable recording agent serving as recording agent containing coloring agent the color of which can be erased by heating; and
   a control section configured to determine whether the image formed on the sheet is formed with the color erasable recording agent or the color inerasable recording agent based on an image data captured by the scanner, and configured to carry out a control, in a case where the image formed on the sheet is an image formed with the color erasable recording agent, to convey the sheet to the second path, in a case where the image formed on the sheet is not an image formed with the color erasable recording agent, to convey the sheet to the third conveyance path.

2. The color erasing apparatus according to claim 1, wherein
   the control section determines that the image formed on the sheet is an image formed with recording agent containing coloring agent the color of which cannot be erased by heating, if a given image is not formed in a given area of the sheet.

3. The color erasing apparatus according to claim 1, wherein
   the control section determines that the image formed on the sheet is an image formed with recording agent containing coloring agent the color of which cannot be erased by heating, if the given image is not formed in the given area located at the front end part in the conveyance direction of the sheet.

4. The color erasing apparatus according to claim 1, wherein
the control section controls not to convey the sheet to the second conveyance path so that the sheet is not subjected to color erasing processing by the color erasing section.

5. The color erasing apparatus according to claim 1, wherein
the control section controls the temperature of the color erasing section when the sheet passes through the color erasing section below a fixing temperature of the recording agent containing coloring agent the color of which cannot be erased, so that the sheet is not subjected to color erasing processing by the color erasing section.

6. The color erasing apparatus according to claim 1, wherein
the control section controls the conveyance speed of the sheet when the sheet passes through the color erasing section to be so fast a speed that the heat capacity required to fix the recording agent containing coloring agent the color of which cannot be erased is not applied to the sheet, so that the sheet is not subjected to color erasing processing by the color erasing section.

7. The color erasing apparatus according to claim 1, wherein
the control section stops the conveyance of the sheet until the control on the sheet is determined.

8. The color erasing apparatus according to claim 1, wherein
the control section determines the color of the sheet and the color of the given image based on the threshold values of the color differences which differ according to the color of the sheet.

9. A color erasing system, comprising:
an image forming apparatus configured to form a pre-determined image at a pre-determined position when forming an image on a sheet with color erasable recording agent serving as recording agent containing coloring agent the color of which can be erased by heating; and
a color erasing apparatus configured to include a first conveyance roller for conveying a sheet along a first conveyance path; a second conveyance roller for conveying the sheet passing through the first conveyance path along a second conveyance path; a third conveyance roller for conveying the sheet passing through the first conveyance path along a third conveyance path; a scanner for capturing an image formed on the sheet passing the first conveyance path; a color erasing section for erasing the color of an image formed on the sheet passing the second conveyance path with the color erasable recording agent; and a control section for determining whether the image formed on the sheet is formed with the color erasable recording agent or the color inerasable recording agent based on an image data captured by the scanner, and carrying out a control, in a case where the image formed on the sheet is an image formed with the color erasable recording agent, to convey the sheet to the second path, in a case where the image formed on the sheet is not an image formed with the color erasable recording agent, to convey the sheet to the third conveyance path.

10. A color erasing control method, including:

conveying a sheet along a first conveyance path;

conveying the sheet passing through the first conveyance path along a second conveyance path;

conveying the sheet passing through the first conveyance path along a third conveyance path;

capturing an image formed on the sheet passing the first conveyance path;

erasing the color of an image formed on the sheet passing the second conveyance path with the color erasable recording agent serving as recording agent containing coloring agent the color of which can be erased by heating;

determining whether the image formed on the sheet is formed with the color erasable recording agent or the color inerasable recording agent based on an image data captured by the scanner; and carrying out a control, in a case where the image formed on the sheet is an image formed with the color erasable recording agent, to convey the sheet to the second path, in a case where the image formed on the sheet is not an image formed with the color erasable recording agent, to convey the sheet to the third conveyance path.

* * * * *